United States Patent
Choksey et al.

(10) Patent No.: US 7,991,932 B1
(45) Date of Patent: Aug. 2, 2011

(54) FIRMWARE AND/OR A CHIPSET DETERMINATION OF STATE OF COMPUTER SYSTEM TO SET CHIPSET MODE

(75) Inventors: Dhruv Choksey, Roseville, CA (US); Martin O. Nicholes, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1145 days.

(21) Appl. No.: 11/786,815

(22) Filed: Apr. 13, 2007

(51) Int. Cl.
- G06F 13/00 (2006.01)
- G06F 13/42 (2006.01)
- G06F 3/00 (2006.01)
- G06F 1/24 (2006.01)
- H04N 7/16 (2006.01)

(52) U.S. Cl. .......... 710/105; 710/16; 710/104; 713/100; 726/26

(58) Field of Classification Search .......... 710/8, 10–11, 710/14–16, 104–105, 301; 726/1, 14, 26, 726/28–30; 713/1, 100
See application file for complete search history.

(56) References Cited

U.S. PATENT DOCUMENTS

| | | |
|---|---|---|
| 7,076,802 B2 | 7/2006 | Poisner |
| 2003/0196088 A1 | 10/2003 | Poisner et al. |
| 2003/0196100 A1 | 10/2003 | Grawrock et al. |
| 2004/0003273 A1 | 1/2004 | Grawrock et al. |
| 2004/0128528 A1 | 7/2004 | Poisner |
| 2004/0128549 A1 | 7/2004 | Poisner |
| 2004/0133722 A1 * | 7/2004 | Croyle et al. ........... 710/105 |
| 2005/0010811 A1 | 1/2005 | Zimmer et al. |
| 2005/0021968 A1 | 1/2005 | Zimmer et al. |
| 2005/0108171 A1 | 5/2005 | Bajikar et al. |
| 2005/0108534 A1 | 5/2005 | Bajikar et al. |
| 2005/0133582 A1 | 6/2005 | Bajikar |
| 2005/0163317 A1 | 7/2005 | Angelo et al. |
| 2005/0166024 A1 | 7/2005 | Angelo et al. |
| 2005/0210467 A1 | 9/2005 | Zimmer et al. |
| 2005/0228993 A1 | 10/2005 | Silvester et al. |
| 2005/0262571 A1 | 11/2005 | Zimmer et al. |
| 2005/0288056 A1 | 12/2005 | Bajikar et al. |
| 2005/0289646 A1 | 12/2005 | Zimmer et al. |
| 2006/0095505 A1 | 5/2006 | Zimmer et al. |
| 2006/0095625 A1 * | 5/2006 | Wootten et al. ........... 710/300 |
| 2006/0112267 A1 | 5/2006 | Zimmer et al. |
| 2006/0112423 A1 * | 5/2006 | Villadiego et al. ........... 726/9 |
| 2006/0140572 A1 | 6/2006 | Furue et al. |
| 2006/0143431 A1 | 6/2006 | Rothman et al. |
| 2006/0224878 A1 | 10/2006 | Datta et al. |
| 2007/0006306 A1 | 1/2007 | Seifert et al. |
| 2008/0052770 A1 * | 2/2008 | Ali et al. ........... 726/9 |
| 2008/0122485 A1 * | 5/2008 | Nagata et al. ........... 326/62 |

OTHER PUBLICATIONS

"ST 19WP18-TPM-C Trusted Platform Module (TPM) With complete TCG Software Solution". Data Sheet. STMicroelectronics. Oct. 2004. pp. 1-6.*
Trusted Computing Group (TCG), "TPM Main (Parts 1, 2, and 3) Specification" Version 1.2, Revision 94, (Mar. 29, 2006) 696 pages.
Trusted Computing Group (TCG), "Trusted Computing Platform Alliance (TCPA) Main Specification", Version 1.1b, (Feb. 22, 2002) 332 pages.

* cited by examiner

*Primary Examiner* — Thomas J Cleary

(57) ABSTRACT

Firmware and/or a chipset of a computer system in an example makes a determination of a state of the computer system and sets the chipset in one of a plurality of modes based on the determination of the state of the computer system.

15 Claims, 3 Drawing Sheets

US 7,991,932 B1

FIRMWARE AND/OR A CHIPSET DETERMINATION OF STATE OF COMPUTER SYSTEM TO SET CHIPSET MODE

BACKGROUND

Discrete Trusted Platform Module (TPM) integrated circuits (ICs) or chips such as offered by Infineon Technologies AG, Munich, Germany (World Wide Web infineon.com) may comprise hardware based security hubs that work in conjunction with software to provide a secure computing environment through cryptographic functions, key storage, digital signatures and certificates, hashes, and the like. Two major types of TPM integrated circuits currently available or being commercially developed are TPM 1.1 and TPM 1.2, which comply with different versions of the Trusted Computing Group specification, namely, version 1.1b and 1.2, respectively. Both the TPM 1.1b and TPM 1.2 integrated circuits are coupled with a standard LPC (Low Pin Count) bus.

The LPC protocol requires a transaction initiator to start a transaction with a special value on the bus called START value. The START value may provide a number of indications, including the start or stop of most types of transactions. TPM 1.1b based discrete integrated circuits use a START value of 0000. TPM 1.2 based discrete integrated circuits use an otherwise reserved START value of 0101 from standard LPC specifications. Neither a TPM 1.1b device nor a TPM 1.2 device will respond to read/write transactions unless the correct START value is driven by the LPC host controller at the start of each transaction.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, a known upgrade of at least the LPC (low pin count) Host Controller chipset or group of integrated circuits (ICs) that are designed to work together such as Southbridge and/or Northbridge in typical consumer systems requires acceptance of all features as defined by the TPM (Trusted Platform Module) 1.2 Specification and requires legacy- or backward-compatibility with TPM 1.1b. The known upgrade applies to the chipset that comprises the LPC Host Controller and/or firmware/software/BIOS (Basic Input/Output System) of the computer system to allow full support for LPC bus based discrete TPM 1.2 chips. It may be desirable to have an alternative to such an upgrade.

An exemplary implementation enables a flexible and intelligent LPC Host Controller. An exemplary implementation identifies the type of TPM as 1.1b or 1.2 at start-up or boot of the computer system. A further exemplary implementation may employ firmware as software embedded in a hardware device to identify the type of TPM as 1.1b or 1.2. An exemplary implementation proceeds with a configuration to drive the correct START value for each TPM bound transaction.

An exemplary implementation allows a chipset to determine the type of TPM in the system, and therefore, determine the type of START value to drive. An exemplary LPC Host Controller based mechanism enables universal support across TPM 1.1b and 1.2 based discrete chips or integrated circuits (ICs). An exemplary implementation comprises a hardware based mechanism optionally employed in conjunction with firmware to pre-enable universal support and seamless transition across two different versions of LPC based, discrete Trusted Platform Module chips, TPM 1.1b and TPM 1.2, each with different LPC (low pin count) protocol requirements.

Figure 1:
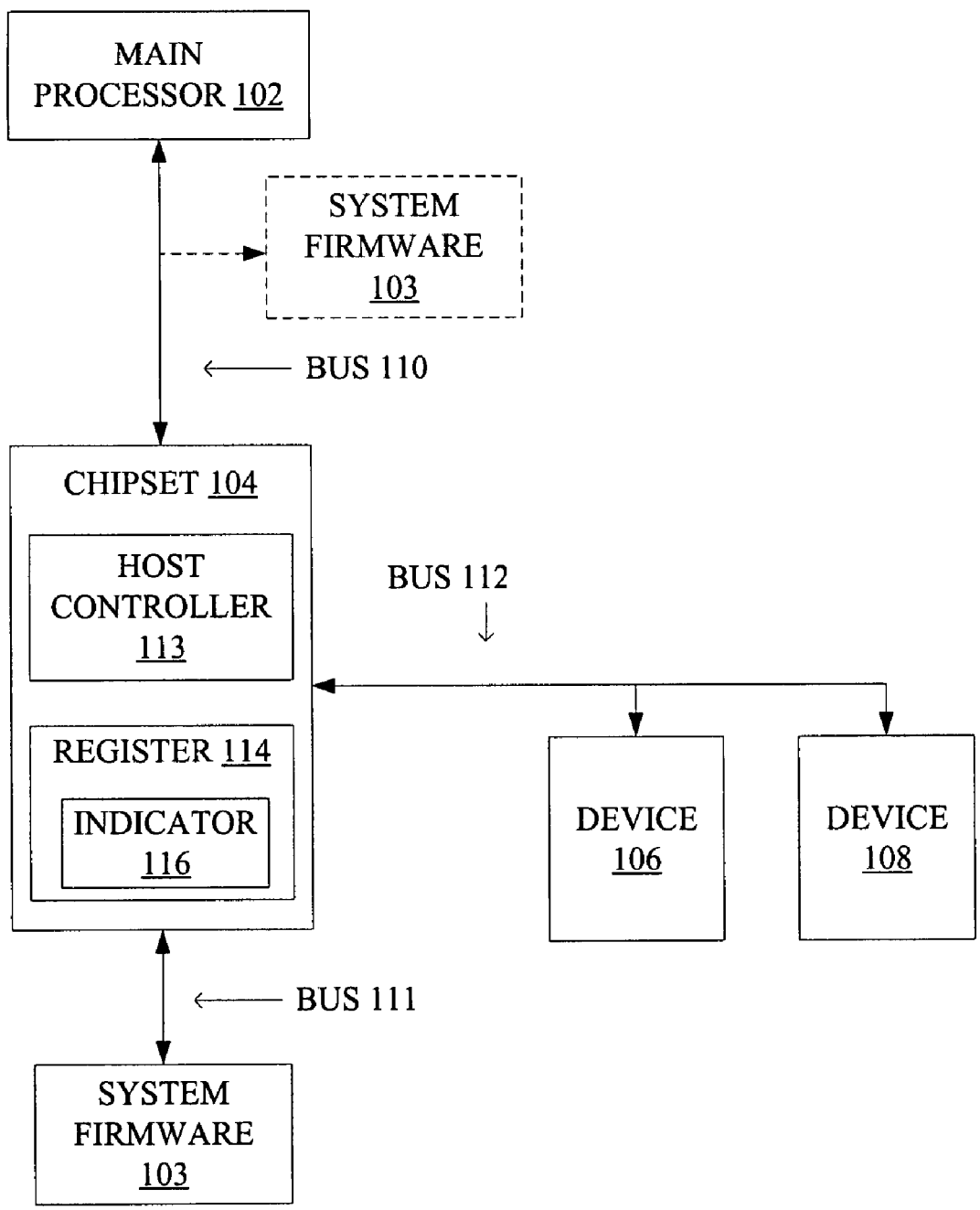
FIG. 1 is a representation of an implementation of an apparatus and/or computer system that comprises one or more of a core or processor such as main processor, firmware such as system firmware, a chipset, one or more devices, and/or one or more buses.

Turning to FIG. 1, an implementation of an apparatus and/or computer system 100 in an example comprises one or more of a core or processor such as main processor 102, firmware such as system firmware 103, a chipset 104, one or more devices 106 and/or 108, and/or one or more buses 110, 111, and/or 112. The system firmware 103 in an example comprises firmware as software embedded in a hardware device. For example, the system firmware 103 comprises a Basic Input/Output System (BIOS). For explanatory purposes, FIG. 1 illustrates an exemplary location of the system firmware 103 on the bus 111 coupled with the chipset 104 as well as an alternative exemplary location of the system firmware 103 on the bus 110 coupled with the main processor 102 and the chipset 104.

The chipset 104 in an example comprises a Southbridge I/O (input/output) Controller Hub (ICH), Northbridge Memory Controller Hub (MCH), and/or a host controller 113, for example, a low pin count (LPC) host controller. In a further example, the chipset 104 comprises memory and/or storage, for example, register 114. The register 114 in an example comprises a location that is flexible and/or dependent on an architecture of the computer system 100. The register 114 in an example comprises an indicator 116 such as a bit that is write-able by the system firmware 103.

An exemplary indicator 116 serves to allow the computer system 100 to proceed based on a determination whether any Trusted Platform Module (TPM) device, a TPM 1.1b device, and/or a TPM 1.2 device is present as the devices 106, 108, as described herein. The indicator 116 in an example may be referred to as a TPM_1P2 bit of the register 114 that is write-able by the system firmware 103. An exemplary device 106, 108 comprises one or more of an LPC peripheral device, a TPM device, and/or a non-TPM device. In an exemplary implementation, a bit in the register 114 as the indicator 116 turned to zero (0) or one (1) by the system firmware 103 serves as a sticky flag employed and/or accessed by the host controller 113 to determine a type of START value with which to drive each TPM bound transaction in an LPC space such as to one or more TPM devices as one or more of the devices 106, 108 on the bus 112.

Figure 2:
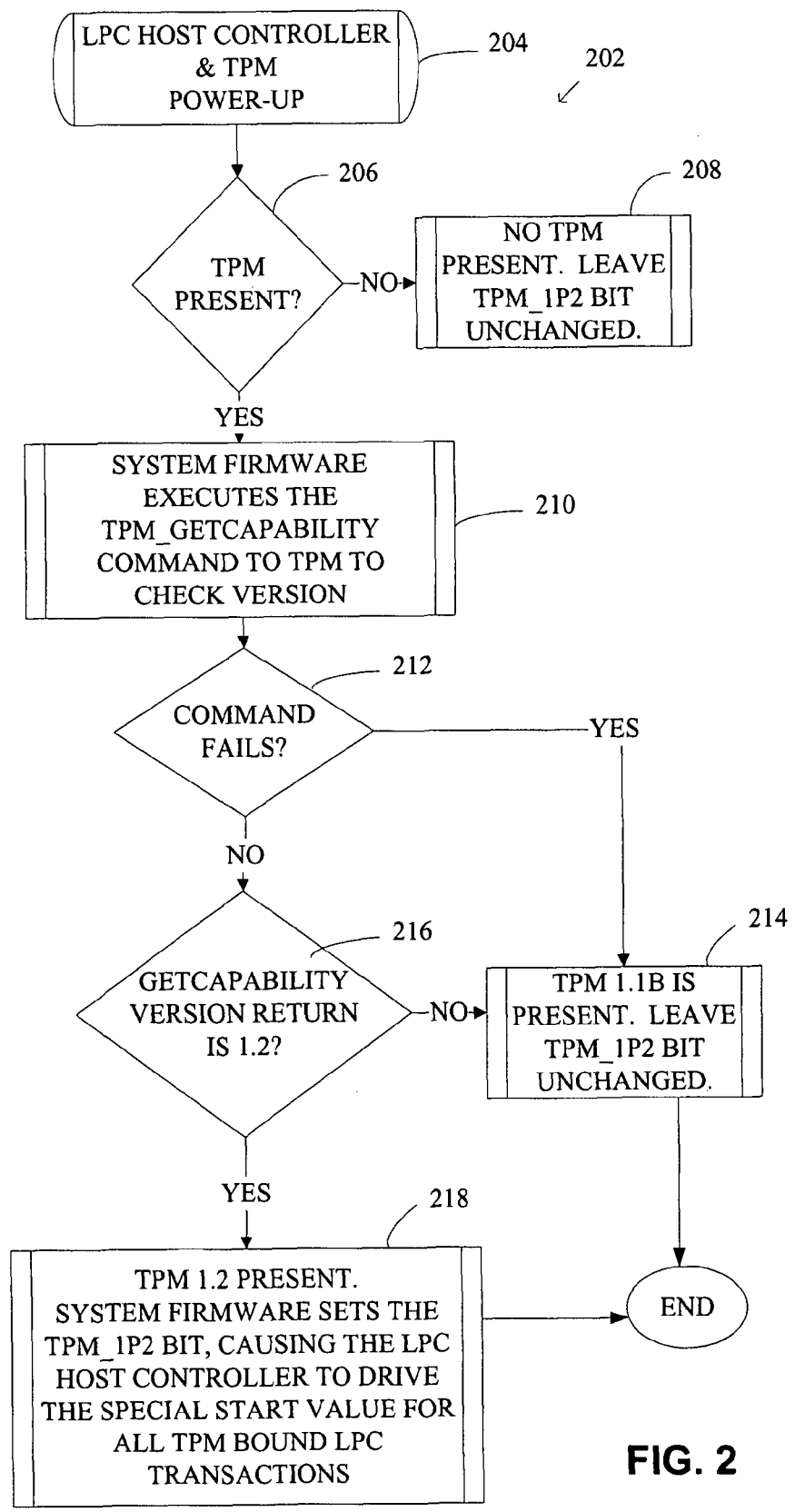
FIG. 2 is a representation of an exemplary logic flow for determination of a type of one or more of the devices and viewable as based in the chipset and assisted with the system firmware of an implementation of the apparatus of FIG. 1.

An illustrative description of an exemplary operation of an implementation of the apparatus 100 is presented, for explanatory purposes. An exemplary implementation may be viewed as based in the chipset 104 and assisted with the system firmware 103 for TPM type detection. Turning to FIG. 2, in an exemplary logic flow 202 at STEP 204 in an example an LPC host controller as the host controller 113 and the TPM device as the device 106, 108 are booted, powered, and/or started up such as from an off condition. The chipset 104 in an example initializes the indicator 116, for example, by setting the TPM_1P2 bit to zero (0), at the boot, power-up, and/or start-up of the computer system 100. STEP 204 in an example proceeds to STEP 206.

At STEP 206 in an example the system firmware 103 determines whether a TPM device as the device 106, 108 is present. For example, the system firmware 103 checks for TPM presence dedicated on the device 106, 108 such as by a presence pin exposed as a bit in the indicator 116 of the register 114 in the chipset 104. If at STEP 206 in an example the system firmware 103 determines NO: a TPM device as the device 106, 108 is not present then STEP 206 proceeds to STEP 208. At STEP 208 in an example the system firmware 103 leaves unchanged the TPM_1P2 bit of the register 114 as the indicator 116, because no TPM device is present as the device 106, 108. The indicator 116 in an example serves to indicate no TPM 1.2 device is present as the device 106, 108 so no special START value should be driven by the host controller 113 on the bus 112.

If at STEP 206 in an example the system firmware 103 determines YES: a TPM device as the device 106, 108 is present on the bus 112 then STEP 206 in an example proceeds to STEP 210. At STEP 210 in an example the system firmware 103 checks the TPM version of the TPM device present as the device 106, 108. For example, the system firmware 103 at STEP 210 executes and/or issues a command to the TPM device present as the device 106, 108 such as the Trusted Computing Group (TCG) TPM Specification defined TPM_GetCapability command to obtain the TPM version information by determining the type of TPM present as the device 106, 108 in the computer system 100. STEP 210 in an example proceeds to STEP 212.

At STEP 212 in an example the system firmware 103 makes a determination of the status of feedback on the TPM version of the TPM device present as the device 106, 108. For example, the system firmware 103 at STEP 212 evaluates whether a command such as the TPM_GetCapability command to the TPM device as the device 106, 108 succeeded or failed. If the command failed at STEP 212 in an example the system firmware 103 proceeds to STEP 214. If the command succeeded at STEP 212 in an example the system firmware 103 proceeds to STEP 216.

At STEP 214 in an example the TPM version of the TPM device present as the device 106, 108 is assumed to be TPM 1.1b, for example, because not all TPM 1.1b devices may have this command implemented, but TPM 1.2 devices are required to implement this command under the TCG TPM Specification. The system firmware 103 at STEP 214 in an example leaves the TPM_1P2 bit as the indicator 116 uninitialized and/or at a default value of zero (0), for example, as a normal, standard, and/or default value of an LPC protocol. The uninitialized and/or default value for the indicator 116 in an example serves to indicate to the host controller 113 to drive and/or continue driving the TPM 1.1b, normal, standard, and/or default START value for all TPM bound LPC transactions on the bus 112 such as to one or more TPM devices as one or more of the devices 106, 108 on the bus 112. The host controller 113 in an example determines by address range decoding whether or not to use special START type. For example, this allows mixing of types of devices 106, 108 as TPM versions and/or non-TPM on the bus 112. To indicate detection of the TPM 1.1b device as the device 106, 108 the system firmware 103 at STEP 214 in an example sets the indicator 116 to zero (0) so the START value driven by the host controller 113 for the entire TPM 1.1b/1.2 address range and on all subsequent TPM 1.1b/1.2 bound transactions is the TPM 1.1b, normal, standard, and/or default START value 0000.

Where the command succeeded at STEP 212 in an example the system firmware 103 proceeds to STEP 216. At STEP 216 in an example the command returns and/or passes to the system firmware 103 the version of TPM for the device 106, 108, for example, TPM 1.1b or TPM 1.2. The system firmware 103 in an example evaluates the return-value of the command, for example, as defined by the TCG TPM Specification to determine the type of TPM present on the bus 112. If the system firmware 103 in an example determines the type is not TPM 1.2 and/or affirmatively determines the type is TPM 1.1b, STEP 216 proceeds to STEP 214 where as described herein in an example the system firmware 103 leaves the TPM_1P2 bit as the indicator 116 uninitialized and/or at a default value of zero (0) to indicate to the host controller 113 to drive and/or continue driving the TPM 1.1b and/or normal START value for all TPM bound LPC transactions on the bus 112, for example, for one or more TPM devices as one or more of the devices 106, 108 on the bus 112.

If at STEP 216 in an example the system firmware 103 determines the type is TPM 1.2, STEP 216 proceeds to STEP 218. The system firmware 103 at STEP 218 in an example changes and/or sets the TPM_1P2 bit as the indicator 116 to a value of one (1). The set value of one (1) for the indicator 116 in an example serves to indicate to the host controller 113 to drive a special and/or TPM 1.2 START value for all TPM bound LPC transactions on the bus 112, for example, for one or more TPM devices as one or more of the devices 106, 108 on the bus 112. To indicate detection of the TPM 1.2 device as the device 106, 108 the system firmware 103 at STEP 218 in an example sets the indicator 116 to one (1) so the START value driven by the host controller 113 for the entire TPM 1.1b/1.2 address range and on all subsequent TPM 1.1b/1.2 bound transactions is the TPM 1.2 and/or special START value 0101. The set-to-one (1) and/or special value for the indicator 116 in an example serves to indicate to the host controller 113 to drive and/or continue driving the TPM 1.2 and/or special START value for all TPM bound LPC transactions on the bus 112 such as to one or more TPM devices as one or more of the devices 106, 108 on the bus 112.

Figure 3:
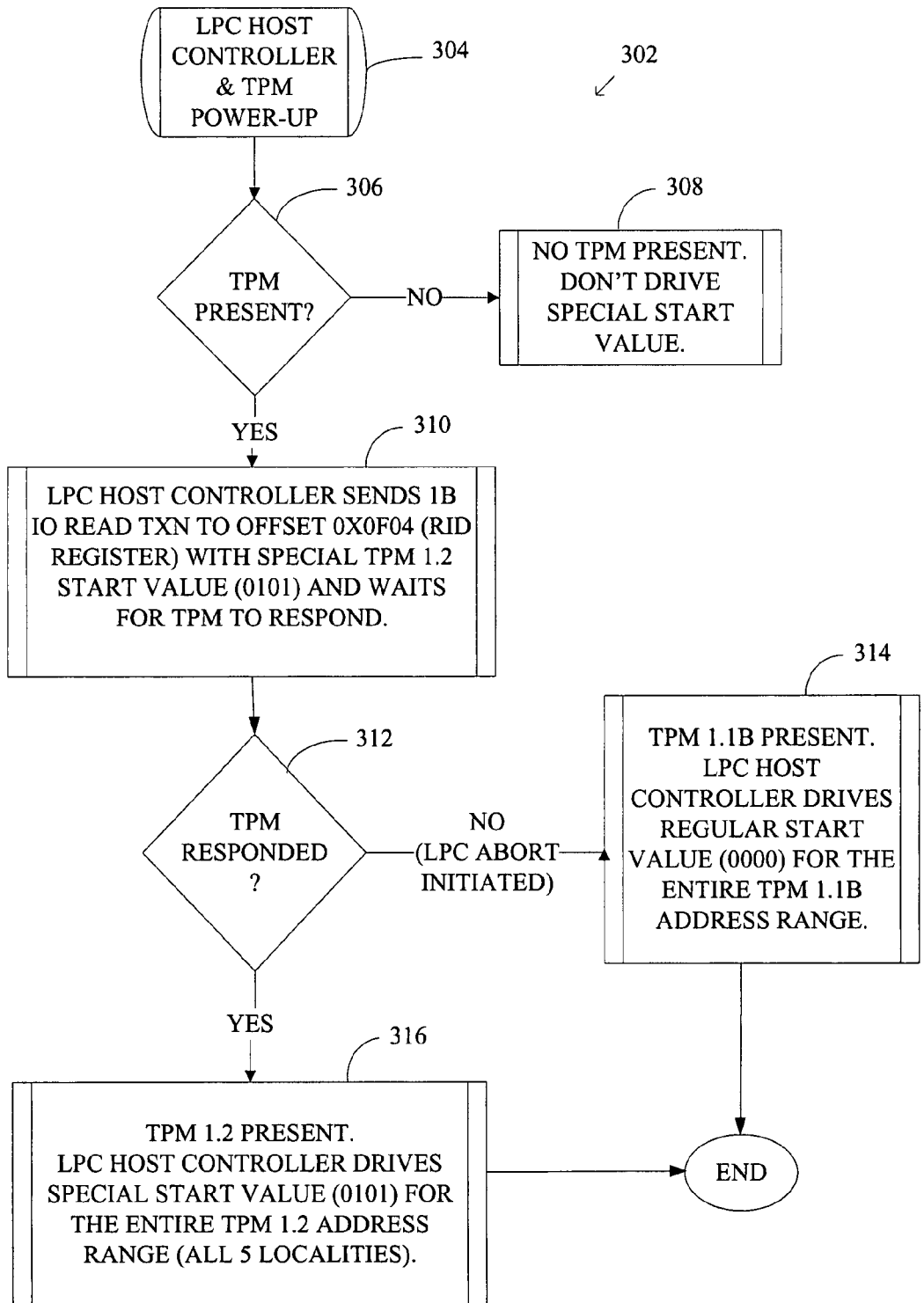
FIG. 3 is a representation of an exemplary logic flow for determination of a type of one or more of the devices and viewable as based in the chipset of an implementation of the apparatus of FIG. 1.

Another exemplary implementation may be viewed as based in the chipset 104 for self-detection of TPM type. For example, the host controller 113 takes advantage of the fact that no other LPC peripheral except for a TPM 1.2 device as the device 106, 108 in an example will respond to the special 0101 START value. Turning to FIG. 3, in an exemplary logic flow 302 at STEP 304 in an example an LPC host controller as the host controller 113 and the TPM device as the device 106, 108 are booted, powered, and/or started up such as from an off condition. The chipset 104 in an example initializes the indicator 116, for example, by setting the TPM_1P2 bit to zero (0), at the boot, power-up, and/or start-up of the computer system 100. STEP 304 in an example proceeds to STEP 306. The chipset 104 in an example initializes the indicator 116, for example, by setting the TPM_1P2 bit to zero (0), at the boot, power-up, and/or start-up of the computer system 100. STEP 304 in an example proceeds to STEP 306.

At STEP 306 in an example the host controller 113 determines whether a TPM device as the device 106, 108 is present. For example, the system firmware 103 checks for TPM presence dedicated on the device 106, 108 such as with a presence pin exposed as a bit in the indicator 116 of the register 114 in the chipset 104. If at STEP 306 in an example the host controller 113 determines NO: a TPM device as the device 106, 108 is not present then STEP 306 proceeds to STEP 308. At STEP 308 in an example the host controller 113 leaves the normal, standard, and/or default START value 0000 in place and understands no TPM 1.2 device is present as the device 106, 108, so no special START value should be driven by the host controller 113 on the bus 112. At STEP 308 in an example the host controller 113 leaves unchanged the TPM__1P2 bit of the register 114 as the indicator 116, because no TPM device is present as the device 106, 108. The indicator 116 in an example serves to indicate no TPM 1.2 device is present as the device 106, 108 so no special START value should be driven by the host controller 113 on the bus 112.

If at STEP 306 in an example the host controller 113 determines YES: a TPM device as the device 106, 108 is present on the bus 112 then STEP 306 in an example proceeds to STEP 310. At STEP 310 in an example the host controller 113 checks the TPM version of the TPM device present as the device 106, 108. For example, the host controller 113 at STEP 310 executes and/or issues a command to the TPM device present as the device 106, 108 such as read to an exemplary and/or architected TPM 1.2 register of the device 106, 108 with the special 0101 START value. The host controller 113 in an example will receive a response to the special START value 0101 only if a TPM 1.2 device is present as the device 106, 108. Exemplary targets and/or candidates for receipt of the command with the special 0101 START value are read-only, DID/VID (device identification/vendor identification), or the RID (revision identification) registers defined by the TPM Interface Specification. The host controller 113 at STEP 310 in an example sends read transaction such as a one byte IO (input/output) read transaction to offset 0x0F04 such as a (RID) register with special TPM 1.2 START value (0101) and waits for a TPM device present as the device 106, 108 to respond. The host controller 113 in an example waits for the response to the command as STEP 310 proceeds to STEP 312.

At STEP 312 in an example the host controller 113 makes a determination of the status of feedback on the TPM version of the TPM device present as the device 106, 108. The host controller 113 at STEP 312 in an example evaluates whether a command such as the read with the special 0101 START value to the device 106, 108 succeeded or failed. The host controller 113 at STEP 312 determines whether the device 106, 108 responded, for example, as a TPM 1.2 device. If the command failed and/or no response was received at STEP 312 in an example the host controller 113 proceeds to STEP 314. If the command succeeded and/or a response was received at STEP 312 in an example the host controller 113 proceeds to STEP 316.

At STEP 314 in an example the TPM version of the TPM device present as the device 106, 108 is assumed to be TPM 1.1b, for example, because all TPM 1.1b devices do not have this command implemented, but TPM 1.2 devices are required to implement this command under the TCG TPM Specification. The host controller 113 at STEP 314 in an example leaves the normal, standard, and/or default START value of zero (0000), for example, as a normal, standard, and/or default value of an LPC protocol. So, the host controller 113 drives and/or continues driving the TPM 1.1b, normal, standard, and/or default START value for all TPM bound LPC transactions on the bus 112 such as to one or more TPM devices as one or more of the devices 106, 108 on the bus 112. To indicate detection of the TPM 1.1b device as the device 106, 108 the host controller 113 at STEP 314 in an example proceeds with the START value driven by the host controller 113 for the entire TPM 1.1b/1.2 address range and on all subsequent TPM 1.1b/1.2 bound transactions as the TPM 1.1b, normal, standard, and/or default START value 0000.

The host controller 103 at STEP 314 in an example leaves the TPM__1P2 bit as the indicator 116 uninitialized and/or at a default value of zero (0), for example, as a normal, standard, and/or default value of an LPC protocol. The uninitialized and/or default value for the indicator 116 in an example serves to indicate to the host controller 113 to drive and/or continue driving the TPM 1.1b, normal, standard, and/or default START value for all TPM bound LPC transactions on the bus 112 such as to one or more TPM devices as one or more of the devices 106, 108 on the bus 112. To indicate detection of the TPM 1.1b device as the device 106, 108 the host controller 113 at STEP 314 in an example sets the indicator 116 to zero (0) so the START value driven by the host controller 113 for the entire TPM 1.1b/1.2 address range and on all subsequent TPM 1.1b/1.2 bound transactions is the TPM 1.1b, normal, standard, and/or default START value 0000.

For example, at STEP 314 the host controller 113 may receive no response from the device 106, 108 or receive an undefined response such as an undefined SYNC value returned by a TPM 1.1b device present as the device 106, 108. Based on this, the host controller 113 in an example knows, understands, and/or interprets that the device 106, 108 is a TPM 1.1b device. The host controller 113 in an example may optionally issue an abort at this point, for example, to cover for a case where a TPM 1.2 device was present as the device 106, 108 but was non-responsive. The host controller in an example at STEP 314 leaves unchanged and/or untouched the TPM__1P2 bit as the indicator 116. The host controller 113 continues to drive the normal, standard, and/or default START value (0000) for all TPM bound LPC transactions on the bus 112 such as to one or more TPM devices as one or more of the devices 106, 108 on the bus 112.

Where the command succeeded and/or received a response such as a conforming response at STEP 312 in an example the host controller 113 proceeds to STEP 316. The host controller 113 at STEP 316 in an example proceeds to drive a special and/or TPM 1.2 START value for all TPM bound LPC transactions on the bus 112, for example, for one or more TPM devices as one or more of the devices 106, 108 on the bus 112. To indicate detection of the TPM 1.2 device as the device 106, 108 the system firmware 103 at STEP 316 proceeds so the START value driven by the host controller 113 for the entire TPM 1.1b/1.2 address range and on all subsequent TPM 1.1b/1.2 bound transactions is the TPM 1.2 and/or special START value 0101. The host controller 113 drives and/or continues driving the TPM 1.2 and/or special START value for all TPM bound LPC transactions on the bus 112 such as to one or more TPM devices as one or more of the devices 106, 108 on the bus 112.

The host controller 113 at STEP 316 in an example changes and/or sets the TPM__1P2 bit as the indicator 116 to a value of one (1). The set value of one (1) for the indicator 116 in an example serves to indicate to the host controller 113 to drive a special and/or TPM 1.2 START value for all TPM bound LPC transactions on the bus 112, for example, for one or more TPM devices as one or more of the devices 106, 108 on the bus 112. To indicate detection of the TPM 1.2 device as the device 106, 108 the host controller 113 at STEP 316 in an example sets the indicator 116 to one (1) so the START value driven by the host controller 113 for the entire TPM 1.1b/1.2 address range and on all subsequent TPM 1.1b/1.2 bound transactions is the TPM 1.2 and/or special START value 0101. The asserted set-to-one (1) and therefore the special value for the indicator 116 in an example serves to indicate to the host controller 113 to drive and/or continue driving the TPM 1.2 and/or special START value for all TPM bound LPC transactions on the bus 112 such as to one or more TPM devices as one or more of the devices 106, 108 on the bus 112.

At STEP 316 in an example the command returns and/or passes to the host controller 113 an expected SYNC value from a TPM as the device 106, 108. Based on this, the host controller 113 in an example knows, understands, and/or interprets that the device 106, 108 is a TPM 1.2 device. For example, the host controller 113 at STEP 316 sets the TPM__1P2 bit to one (1) as a value of the indicator 116 that signals TPM 1.2. The host controller 113 in an example at STEP 316 continues to drive the special START value (0101) for TPM bound LPC transactions going forward, for example, until the TPM__1P2 bit is cleared to zero (0) as a value of the indicator 116 that signals TPM 1.1b, as described herein. In an exemplary implementation, if the system firmware 103 would want to access a TPM 1.2 device as the device 106, 108 in legacy-mode and/or TPM 1.1b mode going forward, the system firmware 103 in an example needs to clear the TPM__1P2 bit to zero (0) from the value of one (1) set by the host controller 113 for the indicator 116. The host controller 113 in an example accesses and/or reads the indicator 116 to ensure that the host controller 113 issues a correct, selected, chosen, proper, and/or desired START value, for example, to one or more TPM devices as one or more of the devices 106, 108 on the bus 112.

An exemplary implementation comprises firmware 103 and/or a chipset 104 of a computer system 100 that makes a determination of a state of the computer system 100 and sets the chipset 104 in one of a plurality of modes based on the determination of the state of the computer system 100.

The firmware 103 and/or the chipset 104 makes a determination one of two types of Trusted Platform Module (TPM) corresponds to the state of the computer system 100. The firmware 103 and/or the chipset 104 detects one of two types of TPM corresponds to one or more peripheral devices 106, 108 on a Low Pin Count (LPC) bus 112 to make the determination of the state of the computer system 100. The firmware 103 and/or the chipset 104 detects the one of two types of TPM corresponds to one or more of the one or more peripheral devices 106, 108 on the Low Pin Count (LPC) bus 112 at boot, power-up, and/or start-up of the computer system 100.

The firmware 103 makes the determination of the state of the computer system 100 and sets the chipset 104 in the one of the plurality of modes based on the determination of the state of the computer system 100. The chipset 104 comprises an indicator 116 that is write-able and readable by the firmware 103. The firmware 103 sets a value of the indicator 116 based on the determination of the state of the computer system 100 to represent the state of the computer system 100. The chipset 104 comprises a host controller 102 coupled with one or more peripheral devices 106, 108 on an LPC bus 112. The host controller 102 employs the value of the indicator 116 to determine a type of START value to drive with each TPM bound transaction on the LPC bus 112.

The chipset 104 comprises a host controller 102 that understands whether to handle a special protocol based on the determination of the state of the computer system 100 by the firmware 103 and/or the chipset 104. The host controller 102 is coupled with one or more peripheral devices 106, 108 on a bus 112. A set of transactions comprises a standard protocol for the bus 112. The special protocol comprises a separate set of transactions that the host controller 102 layers atop the standard protocol when the host controller 102 understands from the determination of the state of the computer system 100 by the firmware 103 and/or the chipset 104 that the host controller 102 is to apply the special protocol.

A set of transactions comprises a standard LPC protocol for the host controller 102 to drive one or more devices 106, 108. The special protocol comprises a separate set of transactions of a special LPC protocol that the host controller 102 layers atop the standard LPC protocol when the host controller 102 understands from the determination of the state of the computer system 100 by the firmware 103 and/or the chipset 104 that the host controller 102 is to apply the special LPC protocol to drive one or more of the one or more devices 106, 108.

The firmware 103 and/or the chipset 104 makes a determination one of two types of Trusted Platform Module (TPM) corresponds to the state of the computer system 100. The host controller 102 understands whether to handle the special protocol based on the determination by the firmware 103 and/or the chipset 104 that the one of two types of TPM corresponds to the state of the computer system 100.

The firmware 103 and/or the chipset 104 issues a command to one or more devices 106, 108 on an LPC bus 112 and evaluates an outcome of the command to make the determination of the state of the computer system 100 and set the chipset 104 in the one of the plurality of modes based on the determination of the state of the computer system 100.

An exemplary approach: auto-detects on a bus 112 a special type of device 106, 108 on the bus 112 that requires special, non-standard cycles on the bus 112; and indicates the special type of device 106, 108 to a controller 102 capable of handling: standard cycles on the bus 112 for a standard type of device 106, 108 on the bus 112; and the special, non-standard cycles on the bus 112 for the special type of device 106, 108 on the bus 112.

An exemplary implementation comprises: one or more computer-readable signal-bearing media of firmware 103 and/or a chipset 104 of a computer system 100; and means in the one or more media for making a determination of a state of the computer system 100 and entering one of a plurality of modes based on the determination of the state of the computer system 100.

The means in the one or more media for making the determination comprises means in the one or more media for making a determination one of two types of Trusted Platform Module (TPM) corresponds to the state of the computer system 100. The means in the one or more media for making the determination comprises means in the one or more media for detecting one of two types of TPM corresponds to one or more peripheral devices 106, 108 on a Low Pin Count (LPC) bus 112 to make the determination of the state of the computer system 100. The means in the one or more media for detecting comprises means in the one or more media for detecting the one of two types of TPM corresponds to one or more of the one or more peripheral devices 106, 108 on the Low Pin Count (LPC) bus 112 at boot, power-up, and/or start-up of the computer system 100.

There is means in one or more computer-readable signal-bearing media of a host controller 102 of the chipset 104 for layering a separate set of transactions atop a standard protocol upon an understanding by the host controller 102 from the determination of the state of the computer system 100 that a special protocol is applicable to drive one or more peripheral devices 106, 108 on a bus 112.

There is means in one or more computer-readable signal-bearing media of a host controller 102 of the chipset 104 for layering a separate set of transactions atop a standard LPC protocol upon an understanding by the host controller 102 from the determination of the state of the computer system 100 that a special LPC protocol is applicable to drive one or more peripheral devices 106, 108 on an LPC bus 112.

The means in the one or more media for making the determination comprises means in the one or more media for making a determination one of two types of Trusted Platform Module (TPM) corresponds to the state of the computer system 100. There is means in the one or more media for understanding whether to handle a special protocol based on the determination that the one of two types of TPM corresponds to the state of the computer system 100.

The means in the one or more media for making the determination comprises means in the one or more media for issuing a command to one or more devices 106, 108 on an LPC bus 112 and evaluating an outcome of the command to make the determination of the state of the computer system 100 and enter the one of the plurality of modes based on the determination of the state of the computer system 100.

An implementation of the apparatus 100 in an example comprises a plurality of components such as one or more of electronic components, chemical components, organic components, mechanical components, hardware components, optical components, and/or computer software components. A number of such components can be combined or divided in an implementation of the apparatus 100. In one or more exemplary implementations, one or more features described herein in connection with one or more components and/or one or more parts thereof are applicable and/or extendible analogously to one or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an implementation of the apparatus 100 employs and/or comprises a set and/or series of computer instructions written in or implemented with any of a number of programming languages, as will be appreciated by those skilled in the art. An implementation of the apparatus 100 in an example comprises any (e.g., horizontal, oblique, or vertical) orientation, with the description and figures herein illustrating an exemplary orientation of an implementation of the apparatus 100, for explanatory purposes.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises memory and/or recordable data storage medium of the firmware 103 and/or the chipset 104. A computer-readable signal-bearing medium for an implementation of the apparatus 100 in an example comprises one or more of a magnetic, electrical, optical, biological, chemical, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a chipset;
   a Low Pin Count (LPC) bus;
   a host controller;
   a Trusted Platform Module (TPM) setting component of a computer system, said TPM setting component configured for:
   detecting at startup of said computer system which, if any, of one of two types of TPM corresponds with a peripheral component coupled with said LPC bus;
   making a determination of which of said two types of TPM corresponds to an existing operational state of the computer system; and
   in response to said computer system being in a TPM state that does not correspond to the detected TPM state, setting the chipset into the type of TPM, of said two types of TPM, which corresponds to the type of TPM detected for said peripheral component.

2. The apparatus of claim 1 in combination with the chipset, wherein the TPM setting component comprises firmware;
   wherein the chipset comprises an indicator that is writeable and readable by the firmware; and
   wherein the firmware sets a value of the indicator based on the determination of the state of the computer system to represent the state of the computer system.

3. The apparatus of claim 2,
   wherein the host controller employs the value of the indicator to determine a type of START value to drive with each TPM bound transaction on the LPC bus.

4. The apparatus of claim 1, wherein the host controller that understands whether to handle a special protocol based on the determination of the state of the computer system by the TPM setting component.

5. The apparatus of claim 4, wherein the host controller is coupled with one or more peripheral devices on a bus, wherein a set of transactions comprises a standard protocol for the bus, wherein the special protocol comprises a separate set of transactions that the host controller layers atop the standard protocol when the host controller understands from the determination of the state of the computer system by the TPM setting component that the host controller is to apply the special protocol.

6. The apparatus of claim 4, wherein a set of transactions comprises a standard LPC protocol for the host controller to drive one or more devices, wherein the special protocol comprises a separate set of transactions of a special LPC protocol that the host controller layers atop the standard LPC protocol when the host controller understands from the determination of the state of the computer system by the TPM setting component that the host controller is to apply the special LPC protocol to drive one or more of the one or more devices.

7. The apparatus of claim 4,
wherein the host controller understands whether to handle the special protocol based on the determination by the firmware and/or the chipset that the one of two types of TPM corresponds to the state of the computer system.

8. The apparatus of claim 1, wherein the TPM setting component issues a command to one or more devices on an LPC bus and evaluates an outcome of the command to make the determination of the state of the computer system and set the chipset in the one of the plurality of modes based on the determination of the state of the computer system.

9. A method, comprising:
detecting at startup of a computer system which, if any, of one two types of Trusted Platform Module (TPM) corresponds with a peripheral component coupled with a Low Pin Count (LPC) bus of said computer system, said detecting performed by a TPM setting component of said computer system;
making a determination of which of said two types of TPM corresponds to an existing operational state of the computer system; and
in response to said computer system being in a TPM state that does not correspond to the detected TPM state, setting a chipset of said computer system into the type of TPM, of said two types of TPM, which corresponds to the type of TPM detected for said peripheral component.

10. A non-transitory computer readable storage medium comprising instructions stored thereon, which, when executed, cause a computer system to perform a method, said method comprising:
detecting at startup of said computer system which, if any, of one two types of Trusted Platform Module (TPM) corresponds with a peripheral component coupled with a Low Pin Count (LPC) bus of said computer system, said detecting performed by a TPM setting component of said computer system;
making a determination of which of a plurality of types of TPM corresponds to an existing operational state of the computer system; and
in response to said computer system being in a TPM state that does not correspond to the detected TPM state, setting a chipset of said computer system into the type of TPM, of said plurality of types of TPM, which corresponds to the type of TPM detected for said peripheral component.

11. The non-transitory computer readable storage medium of claim 10, wherein said making a determination of which of a plurality of types of TPM corresponds to an existing operational state of the computer system comprises:
making a determination of which of TPM 1.1b or TPM 1.2 corresponds to said existing state of said computer system.

12. The non-transitory computer readable storage medium of claim 11,
wherein said method further comprises:
understanding whether to handle a special protocol based on the determination that the one of two types of TPM corresponds to the state of the computer system.

13. The non-transitory computer readable storage medium of claim 10, wherein said detecting at startup of said computer system which, if any, of one two types of Trusted Platform Module (TPM) corresponds with a peripheral component coupled with a Low Pin Count (LPC) bus of said computer system comprises:
detecting at startup which of TPM 1.1b or TPM 1.2 corresponds with said peripheral component.

14. The non-transitory computer readable storage medium of claim 10, wherein said method further comprises:
layering a separate set of transactions atop a standard LPC protocol upon an understanding by a host controller from the determination of the state of the computer system that a special LPC protocol is applicable to drive one or more peripheral devices on said LPC bus.

15. The non-transitory computer readable storage medium of claim 10, wherein said method further comprises:
issuing a command to one or more devices on said LPC bus; and
evaluating an outcome of the command to make the determination of the state of the computer system and enter the one of the plurality of modes based on the determination of the state of the computer system.

* * * * *